United States Patent
Dämon et al.

(10) Patent No.: US 9,276,242 B2
(45) Date of Patent: Mar. 1, 2016

(54) BATTERY CELL ARRANGEMENT

(75) Inventors: Peter Dämon, Lassnitzhöhe (AT); Stefan Roepke, Graz (AT); Herbert Thanner, Graz (AT); Ralph Wünsche, Graz (AT)

(73) Assignee: Samsung SDI CO., Ltd., Yongin-si (KR)

( * ) Notice: Subject to any disclaimer, the term of this patent is extended or adjusted under 35 U.S.C. 154(b) by 381 days.

(21) Appl. No.: 13/504,531

(22) PCT Filed: Oct. 28, 2010

(86) PCT No.: PCT/EP2010/066350
§ 371 (c)(1),
(2), (4) Date: May 8, 2012

(87) PCT Pub. No.: WO2011/051386
PCT Pub. Date: May 5, 2011

(65) Prior Publication Data
US 2012/0214033 A1  Aug. 23, 2012

Related U.S. Application Data

(60) Provisional application No. 61/255,640, filed on Oct. 28, 2009.

(51) Int. Cl.
*H01M 2/02* (2006.01)
*H01M 2/10* (2006.01)
(Continued)

(52) U.S. Cl.
CPC .......... *H01M 2/0275* (2013.01); *H01M 2/0212* (2013.01); *H01M 2/1061* (2013.01); *H01M 2/1077* (2013.01); *H01M 2/1252* (2013.01); *H01M 10/02* (2013.01); *H01M 10/0413* (2013.01); *H01M 10/0436* (2013.01); *H01M 10/0486* (2013.01); *H01M 10/613* (2015.04); *H01M 10/625* (2015.04); *H01M 10/647* (2015.04); *H01M 10/6556* (2015.04); *H01M 10/6567* (2015.04); *H01M 2/1235* (2013.01); *H01M 6/42* (2013.01); *H01M 6/50* (2013.01);
(Continued)

(58) Field of Classification Search
CPC .... H01M 6/65; H01M 6/6567; H01M 6/6568
See application file for complete search history.

(56) References Cited

U.S. PATENT DOCUMENTS 4,552,823 A * 11/1985 Wozniak .......................... 429/81
2006/0083984 A1 * 4/2006 Oh et al. ........................ 429/176
(Continued)

FOREIGN PATENT DOCUMENTS

| DE | 195 19 883 C1 | 6/1996 |
|----|---|---|
| JP | 2007 087922 | 4/2007 |
| JP | 2008 204816 | 9/2008 |

*Primary Examiner* — Jeremiah Smith
(74) *Attorney, Agent, or Firm* — Lewis Roca Rothgerber Christie LLP

(57) ABSTRACT

A battery cell arrangement having a battery cell which is in the form of a film cell and includes a flat cell body with two end faces, a flexible cell rim surrounding the cell body, and two contact sections arranged on a rim side of the battery cell. The battery cell arrangement further has a frame arrangement which includes a first frame element and a second frame element which frames the cell body on all sides on the rim. At least one vent opening is provided on a side of the frame arrangement which faces away from the end faces of the cell body, in order to allow fluid, in particular gas, to emerge from the battery cell arrangement in the event of damage.

19 Claims, 4 Drawing Sheets

(51) Int. Cl.

| | | |
|---|---|---|
| *H01M 10/02* | (2006.01) | |
| *H01M 10/04* | (2006.01) | |
| *H01M 10/625* | (2014.01) | |
| *H01M 10/647* | (2014.01) | |
| *H01M 10/6556* | (2014.01) | |
| *H01M 10/6567* | (2014.01) | |
| *H01M 10/613* | (2014.01) | |
| *H01M 6/50* | (2006.01) | |
| *H01M 10/65* | (2014.01) | |
| *H01M 10/60* | (2014.01) | |
| *H01M 10/6568* | (2014.01) | |
| *H01M 2/12* | (2006.01) | |
| *H01M 6/42* | (2006.01) | |

(52) U.S. Cl.
CPC .............. *H01M 6/5038* (2013.01); *H01M 10/60* (2015.04); *H01M 10/65* (2015.04); *H01M 10/6568* (2015.04)

(56) References Cited

U.S. PATENT DOCUMENTS

| | | | |
|---|---|---|---|
| 2006/0204840 A1* | 9/2006 | Jeon et al. | 429/152 |
| 2007/0154799 A1* | 7/2007 | Yoon et al. | 429/176 |
| 2007/0184337 A1* | 8/2007 | Nagayama et al. | 429/53 |
| 2008/0171259 A1* | 7/2008 | Kanai et al. | 429/53 |
| 2009/0017365 A1 | 1/2009 | Miyahisa | |
| 2009/0023061 A1* | 1/2009 | Ogg et al. | 429/162 |
| 2009/0029239 A1* | 1/2009 | Koetting et al. | 429/82 |

* cited by examiner

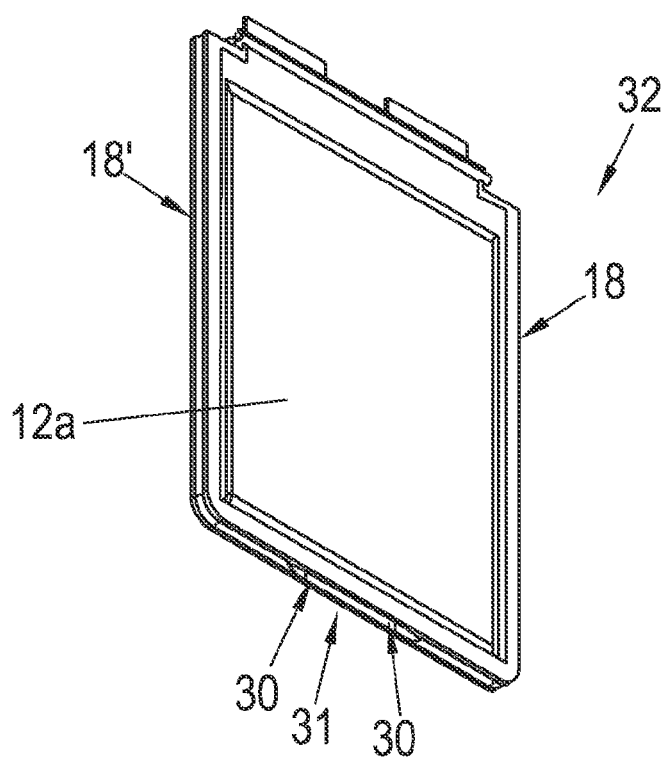
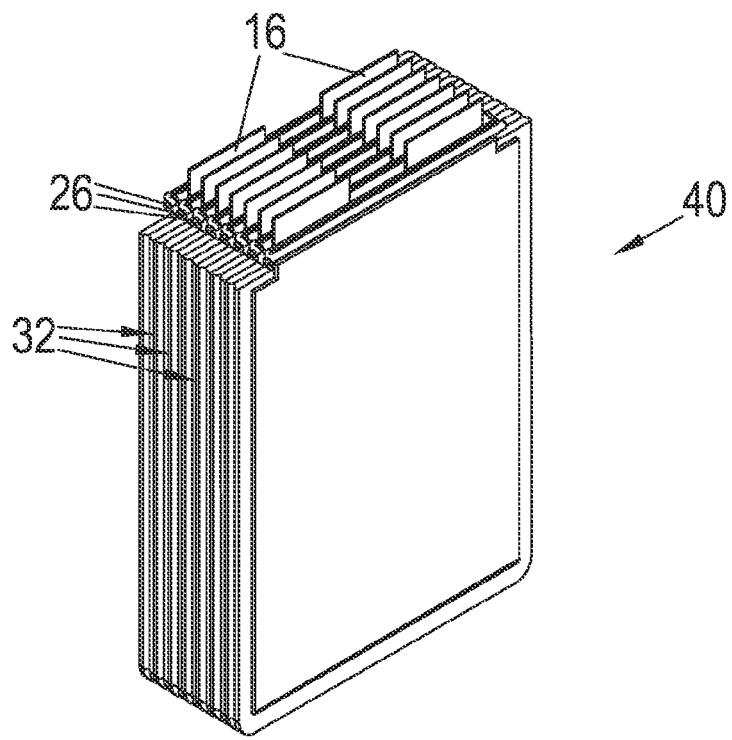

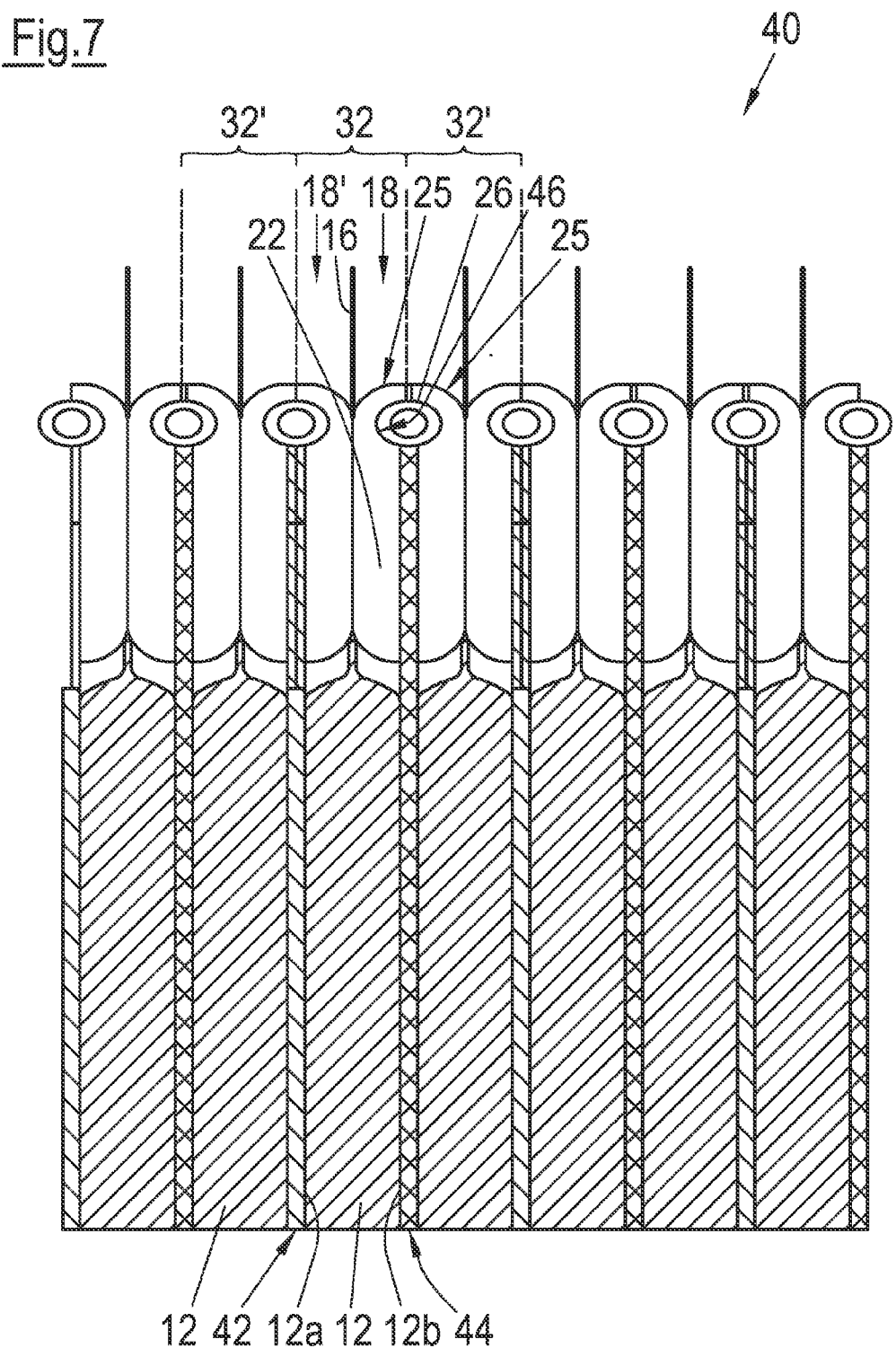

BATTERY CELL ARRANGEMENT

CROSS-REFERENCE TO RELATED APPLICATIONS

The present application is a National Stage Application of PCT International Application No. PCT/EP2010/066350 (filed on Oct. 28, 2010), under 35 USC. §371, which claims priority to U.S. Provisional Patent Application No. 61/255,640 (filed on Oct. 28, 2009), which are each hereby incorporated by reference in their respective entireties.

FIELD OF THE INVENTION

The present invention relates to a battery cell arrangement having a battery cell which is in the form of a film cell.

BACKGROUND OF THE INVENTION

Film cells such as battery cells do not have a solid housing, but the components of the battery cell which are required to store electrical energy are surrounded by a robust film which forms a cell rim, like a fold, on the narrow faces of the cell body. Because there is no solid housing, the battery cell has a certain amount of flexibility, making it easier to use in a physical space which is often confined. Furthermore, film cells such as these—also referred to as pouch cells—are reliable and are comparatively cost-effective. However, the battery cell must be fixed by a device to make them robust.

In many application fields, a plurality of battery cell arrangements of the type mentioned initially are combined to form an energy store. By way of example, energy stores such as these are used in hybrid or electrical vehicles. In order to save space, the battery cell arrangements are arranged packed as tightly as possible, for example by being stacked. The spatially tight arrangement of the battery cell arrangements places stringent requirements on the components which support the battery cells, in particular with respect to the battery cells being fixed in a compact manner, and at the same time reliably. It is also necessary to ensure that, for example in the event of damage to the battery cell, battery cell arrangements or other components which are arranged adjacent are not damaged, or are damaged as little as possible.

SUMMARY OF THE INVENTION

One object of the present invention is therefore to provide a battery cell arrangement of the type mentioned initially, which is compact and allows reliable fixing of the battery cell. Another aim is for the battery cell arrangement to also comply with stringent safety requirements, and to be producible cost-effectively.

In accordance with the invention, the battery cell has a flat cell body with two end faces, a flexible cell rim surrounding the cell body, and two contact sections arranged on a rim side of the battery cell. A frame arrangement which comprises a first frame element and a second frame element is furthermore provided, which frame arrangement frames the cell body on all sides on the rim. At least one vent opening is provided on a side of the frame arrangement which faces away from the end faces of the cell body, in order to allow fluid, in particular gas, to emerge from the battery cell arrangement in the event of damage.

In other words, although the frame elements surround the cell body at the side while leaving its end faces free, a fluid which emerges, for example, from the cell body can in general, however, not emerge through the openings which are left free on the end faces of the frame elements since these are covered in a battery by battery cell arrangements which are arranged adjacent and are of the same or similar design. In conventional batteries having known battery cell arrangements, a leakage from the battery cell leads to fluid, generally an aggressive liquid and/or an aggressive gas, collecting in the battery cell arrangement. For example, because of its pressure and/or its chemical reaction capability, the fluid can cause considerable damage to the components of the battery cell arrangement.

In order to prevent this, in addition to the large-area openings in the frame elements, which opening, leave the end faces of the cell body free, the frame arrangement has at least one additional opening—the vent opening which has already been mentioned above—through which the fluid can escape. An opening such as this can be provided in a simple manner, without this adversely affecting the robustness of the battery cell arrangement.

The vent opening may be associated with a face of the battery cell which is opposite the rim face, which has the contact section, of the battery cell. This reliably protects the contact sections which allow electrical contact with the battery cell and which, in general, together with the electrical system connected to them, are comparatively sensitive to the said fluids. This also makes it largely possible to prevent the occurrence of short circuits caused directly or indirectly by the fluid.

In order to ensure that liquids which occur in the internal area of the battery cell arrangement emerge as efficiently as possible, the vent opening can be arranged at the bottom when the battery cell arrangement is in the installed position.

In accordance with one embodiment of the battery cell arrangement, the vent opening is formed by a recess on the first frame element and/or by a recess on the second frame element. In particular recesses of complementary design are arranged on the first frame element and on the second frame element, and together form the vent opening.

The waste heat which occurs during charging and/or discharging processes of the battery cell can be dissipated efficiently if the frame arrangement at least partially forms at least one cooling channel, which extends along a side of the frame arrangement which is associated with the contact sections. The heat which occurs in this area during operation can be dissipated particularly efficiently. The contact sections which make it possible to tap off the stored electrical energy are furthermore cooled directly. The cooling channel need not be formed completely on the frame arrangement but, together with other components, can provide a cooling device which allows coolant, for example water, to be supplied.

It is possible to provide that the cooling channel extends only along that side of the frame arrangement which is associated with the contact sections, in order to keep the battery cell arrangement design as simple as possible. In many cases, it is sufficient for the other sides of the frame arrangement to be free of cooling channels, provided that the contact sections which allow the electrical connection of the battery cell and the face of the cell rim which is associated with them are cooled.

In particular, the cooling channel runs at the side adjacent to the contact sections of the battery cell and, in particular, runs on a plane which is arranged offset parallel to a plane which is defined by the contact sections. The contact sections are therefore also efficiently cooled. The said plane may, for example, be a separating plane between two battery cell arrangements which are arranged adjacent in a battery.

A physically simple configuration of a cooling system which is intended for cooling of the battery cell arrangement is obtained if an inlet opening and an outlet opening of the cooling channel are arranged on opposite sides of the frame arrangement.

In order to minimize the flow resistance produced by the cooling channel, it may have a straight-line profile.

In accordance with one embodiment, the first frame element of the frame arrangement forms half of a first cooling channel, and the second frame element of the frame arrangement forms half of a second cooling channel, with one of the two frame elements together with the other of the two frame elements of a frame arrangement of identical design forming a complete first or second cooling channel. In particular, the respective cooling channel halves are formed by a recess in the form of a groove. This allows any desired number of frame arrangements to be stacked alongside one another or one on top of the other, with two adjacent frame arrangements together forming a respective cooling channel.

A tubular component can be inserted into the respective cooling channel. In particular, the tubular component is a separate component. A complementary design of the cooling channel and of the component allows improved heat transfer, and therefore better dissipation of the waste heat created during operation of the battery cell.

The cooling channel may be arranged on a holding section which extends from one of the frame elements in a direction which, in particular, is parallel to the planes which are formed by the end faces, in order to allow the cooling channel to pass by as close as possible to the contact sections in a suitable manner, while at the same time allowing the cooling channel to be easily physically connected to a corresponding coating system.

In order to improve the cooling of the battery cell, in particular in the area of the end faces, a cold plate may be provided, which is thermally conductively connected to, and in particular is in direct contact with, the cooling channel and covers an area at least in places on one of the end faces of the cell body.

In order to make it possible to compensate for thickness variations of the battery cell, which occur, for example, in the event of so-called "cell breathing" during charging and discharging of the battery cell, at least one of the end faces of the cell body is covered over an area, at least in places, with an elastomer layer. This further protects the end face against damage.

In particular, at least one of the frame elements has a depression for holding the cold plate and/or the elastomer layer, with the depression being arranged in particular on a face of the frame element which faces away from the cell body, in order to make the battery cell arrangement as compact as possible.

It is possible to provide that the frame arrangement comprises a clamping apparatus by means of which the cell rim can be clamped in with a friction fit between the frame elements, in order to fix the battery cell.

In accordance with a further embodiment, the clamping apparatus has a slot, which is formed on one of the frame elements, and a projection, which has a complementary shape and is formed on the other frame element, in order to create a tongue-and-groove connection, by means of which the cell rim is at least partially clamped in. This improves the friction-fit fixing of the battery cell, as already mentioned above. The clamping apparatus may extend (with respect to a vertical installation position of the battery cell arrangement) along the entire height of the cell body on two mutually opposite sections of the frame arrangement, in order in this way to ensure that the battery cell is fixed over as large an area as possible.

This ensures that the battery cell is fixed reliably even in the event of any distortion of the battery cell which may occur during operation.

In order to reduce the production costs of the battery cell arrangement, the two frame elements may be physically identical.

The invention furthermore relates to a battery arrangement having a plurality of battery cell arrangements which are arranged in the form of a stock, as claimed in at least one of the embodiments described above. In particular, each battery cell is associated with a first and a second frame element, with the first frame elements being physically identical and with the second frame elements being physically identical. Only two different types of identical parts are therefore required in order to provide the components which fix the battery cell. Particularly cost-effective production and assembly are achieved if (with the exception of those battery cells which are provided at the start and end of the stack) each battery cell is in principle associated with one and only one first and one second frame element.

Further embodiments of the invention can be found in the description, the claims and the drawings.

BRIEF DESCRIPTION OF THE DRAWINGS

The invention is described below by means of exemplary embodiments illustrated in the drawings in which show:

FIG. 5 illustrates a perspective view of the battery cell arrangement as illustrated in FIG. 3.

FIG. 6 illustrates one embodiment of the battery arrangement in accordance with the invention.

FIG. 7 illustrates, schematically, a cross section through one embodiment of the battery arrangement in accordance with the invention.

DETAILED DESCRIPTION OF EMBODIMENTS

Figure 1:
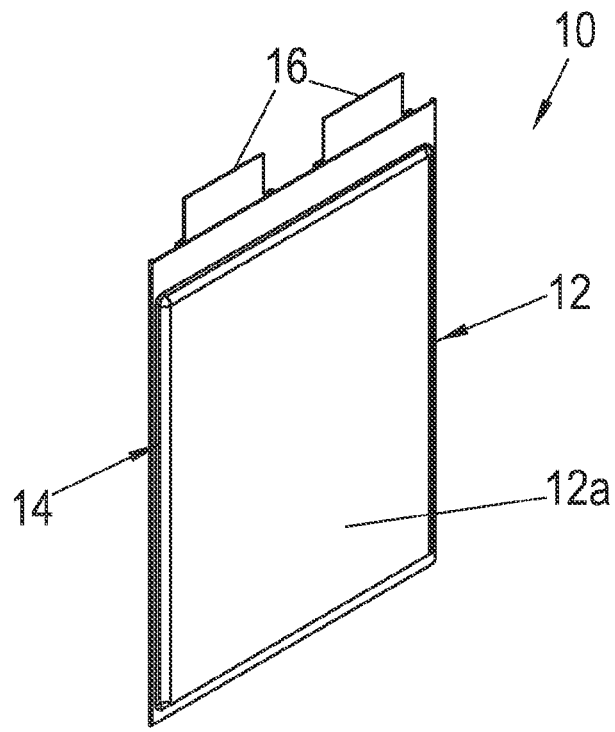
FIG. 1 illustrates a battery cell in the form of a film cell.

FIG. 1 illustrates a battery cell 10 which is in the form of a film cell. Film cells such as these are also referred to as pouch cells. Instead of a solid housing, they have a sheath in the form of a film, and therefore have a certain amount of flexibility.

The battery cell 10 comprises a flat, rectangular cell body 12 with end surfaces 12a, 12b (end surface 12b cannot be seen in FIG. 1), which surrounds the functional components that are required to store electrical energy. On the outer perimeter thereof, the cell body 12 is surrounded by a cell rim 14 in the form of a fold. Furthermore, on the upper face (with respect to the vertical installation position illustrated here), the battery cell 10 has contact sections 16 by means of which the battery cell 10 can be electrically charged and/or discharged.

Figure 2:
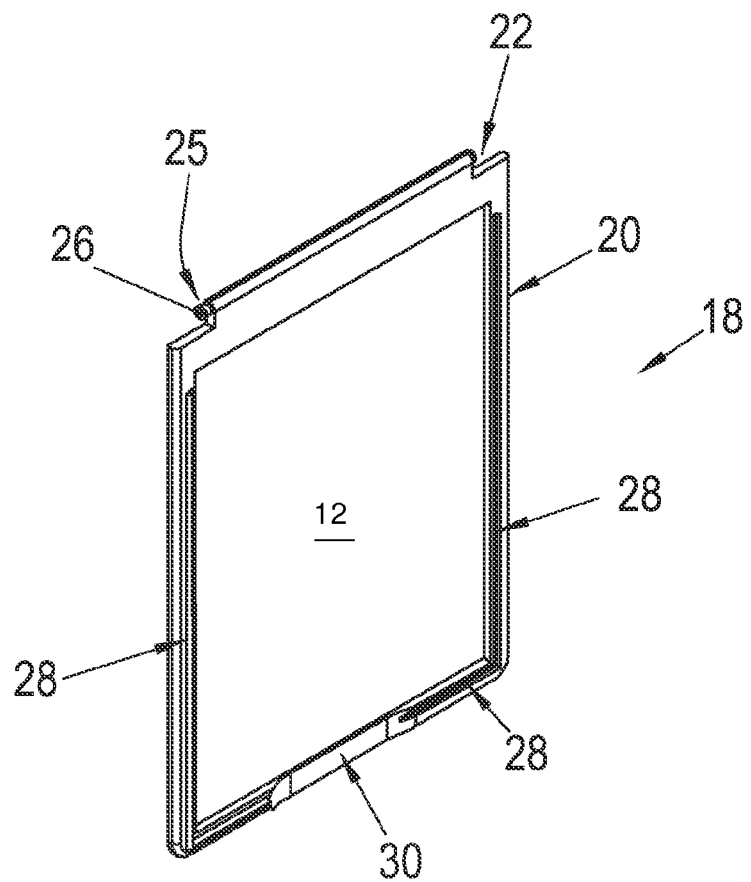
FIG. 2 illustrates one embodiment of a frame element.

Since the battery cell 10 has comparatively little internal robustness, it must be provided with a supporting element, which is expediently of compact design. FIG. 2 illustrates a frame element 18 which is intended for this purpose. The frame element 18 comprises a frame section 20 which surrounds the cell body 12 after assembly while at the same time leaving its end surfaces 12a, 121 free. A holding section 22 is provided on the frame section 20 and extends away from the frame section 20 on the frame section plane. On its face which faces away from the frame section 20, the holding section 22 has a cooling channel 25 in which a cooling tube 26 is arranged. As can be seen more clearly in FIG. 7, the cooling channel 25 surrounds only approximately half of the cooling tube 26.

On the left-hand and right-hand faces, and partially on its lower face, the frame section 20 has a clamping apparatus 28, which is used to improve the friction-fit fixing of the cell rim 14. The function of the clamping apparatus 28 will be explained in more detail in the following text. Furthermore, a recess 30 is provided on the lower face of the frame section 20. In this area, the thickness of the frame section 20 of the frame element 18 is reduced in comparison to the other sections of the frame section 20. In addition, the function of the recess 30 will be explained in more detail in the following text.

Figure 3:
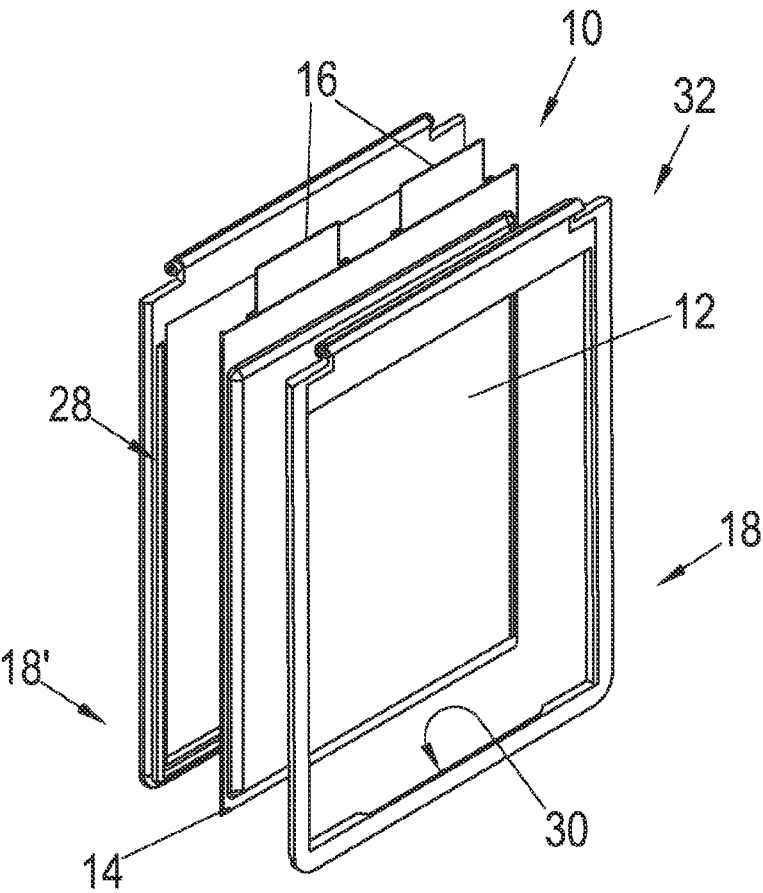
FIG. 3 illustrates an exploded illustration of one embodiment of the battery cell arrangement in accordance with the invention.

FIG. 3 illustrates an exploded illustration of the major components of a battery cell arrangement 32. The battery cell arrangement 32 comprises two preferably physically identical frame elements 18, 18', between which the battery cell 10 is clamped in during its assembly. The cell rim 14 thereof is in this case held by the clamping apparatus 28 over virtually the entire height of the cell body 12, on the right-hand and left-hand faces of the battery cell 10 in FIG. 3. No clamping apparatus is provided on the upper face of the respective frame element 18, 18', associated with the contact sections 16, in order not to damage the electrical contact between the contact sections 16 and the interior of the cell body 12. On the lower face of the battery cell 10, the cell rim 14 is likewise held by the clamping apparatus 28, with the exception of the area of the recesses 30. In other words, more than half of the circumference of the cell rim 14 is held by the clamping apparatus 28, in order to ensure that the battery cell 10 is reliably fixed between the frame elements 18, 18'.

Figure 4:
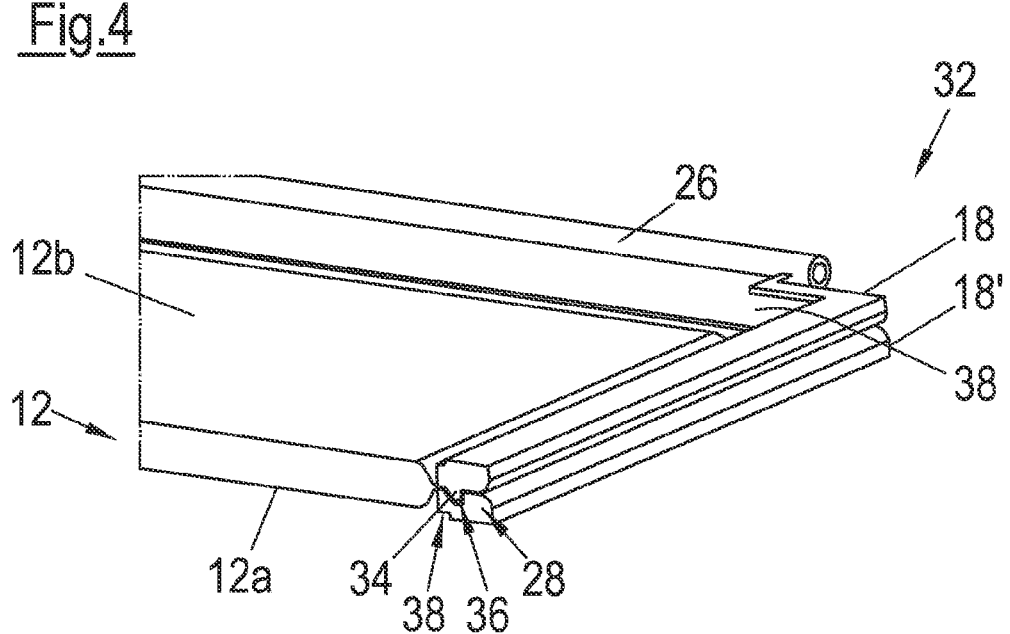
FIG. 4 illustrates a cross section through the battery cell arrangement as illustrated in FIG. 3.

FIG. 4 illustrates a cross section through the battery cell arrangement 32. As can be seen, the clamping apparatus 28 surrounds a projection 34 on the upper frame element 18, which projection 34 is associated with a slot 36 of complementary shape on the lower frame element 18'. A flank of the projection 34 or of the slot 36 facing the cell body 12 runs obliquely to the end surfaces 12a, 12b, in order to avoid sharp edges, and the cell rim 14 is protected.

In order to have to provide only one embodiment of the frame element 18, 18' for production of a battery cell arrangement 32, it is possible to provide for the clamping apparatus 28 to be in the form of a projection 34 on one face (for example the left-hand face) of the frame section 20, and to be in the form of a slot 36 on the opposite face (for example the right-hand face). The frame elements 18, 18' are then identical parts.

Together, the projection 34 and the slot 36 form a tongue-and-groove connection, into which the cell rim 14 is clamped. Those surfaces of the frame elements 18, 18' which are opposite the projection 34 and the slot 36 are planar, in order to allow a plurality of battery cell arrangements 32 of identical design to be stacked alongside one another or one on op of the other.

FIG. 4 also illustrates that the frame elements 18, 18' each have a recess 38 on the end face opposite to the projection 34 and the slot 36, into which recess 38 elements like plates can be inserted in order to improve the cooling or to protect the end surfaces 12a, 12b.

FIG. 5 illustrates a perspective view of an assembled battery cell arrangement 32. The choice of the perspective makes it possible to see a vent opening 31, which is formed by the two recesses 30 in the frame elements 18, 18', on the lower face of the battery cell arrangement. 32 in the installation position. This makes it possible for gases and/or liquids to emerge from the battery cell arrangement 32. This is particularly important when the battery cell arrangement 32 is part of a stack of a plurality of corresponding battery cell arrangements 32, such that no fluid can emerge through the openings associated with the end surfaces 12a, 12b of the cell body 12 in the frame elements 18, 18', since this is covered by the adjacent battery cell arrangement 32.

FIG. 6 illustrates a battery arrangement 40, which consists of a plurality of battery cell arrangements 32 of essentially identical design. The illustration shows that the cooling tubes 26 in the individual arrangements 32 can be connected in a simple manner to collecting lines for a coolant, which collecting lines run, for example, at right angles to the cooling tubes 26. Since the cooling tubes 26 are designed to be free of bends, the flow resistance caused by them is low, thus making it possible to produce an efficient coolant flow. As can also be seen, the cooling tubes 26 cool, in particular, areas around the contact sections 16, which require a particularly large amount of cooling. The illustrated configuration of the battery arrangement 40 and of the battery cell arrangements 32 which form them represents one possible way of on the one hand designing the cooling of the battery cells 10 to be as efficient as possible, while on the other hand avoiding complex designs, which are therefore costly and susceptible to faults.

FIG. 7 illustrates a detail of a cross section through the battery arrangement 40 at right angles to the end surfaces 12a, 12b of the cell bodies 12. The design of the battery arrangement 40 will be explained by way of example with reference to the indicated battery cell arrangements 32, 32'.

The cell body 12 of the battery cell arrangement 32 makes contact on its left-hand end surface 12a with an elastomer layer 42, which essentially completely covers it. Because of its elasticity, the elastomer layer 42 allows flexible thickness compensation for the cell body 12. In other words, it absorbs changes in the distance between adjacent cell bodies 12 in order on the one hand to avoid play between them and on the other hand to allow the initially mentioned "cell breathing." Complete suppression of the "cell breathing," as occurs, for example, when using rigid spaces, adversely affects the performance of the battery cells 10.

The end surface 12b of the cell body 12 makes contact with a cold plate 44, which extends to the cooling tube 26 associated with the battery cell arrangement 32. The cooling tube 26 is arranged in a groove 46 in the cooling channel 25. The cooling channel 25 is connected via the holding section 22 to the frame section 20 of the frame element 18 (cf. FIG. 2).

As already explained a number of times above, the cell rim 14 is clamped in between the respective frame sections 20 of the frame elements 18, 18' of the battery cell arrangement 32. The contact sections 16 also extend through this. The contact sections 16 run from the interior of the cell body 12 into an area which is cooled by the cooling tube 26, and beyond it. They are therefore cooled particularly efficiently. Waste heat which occurs in the area of the end surface 12b in the battery cell 10 is dissipated via the cold plate 44 of the battery cell arrangement 32, which cold plate 44 is likewise cooled by the cooling tube 26.

FIG. 7 furthermore illustrates that, because the adjacent battery cell arrangements 32, 32' are designed to be essentially identical, this results, in an efficient manner, in a battery arrangement 40 which is tightly packed and nevertheless reliably cooled at the same time, with reliably fixed battery cells 10. Each battery cell arrangement 32, 32' is in each case associated with an elastomer layer 42 and a cold plate 44 as well as a cooling tube 26. These components are, however, also used by the respectively adjacent battery cell arrangement 32' or 32, because of the regular arrangement, thus providing a cyclically repeating configuration of the functional components for an elastomer layer 42, cell body 12, cold plate 24.

The grooves 46 in the cooling channels 25 in the frame elements 18, 18' reliably protect the cooling tubes 26. For initial assembly, all that is necessary is to insert one cooling tube 26 for each battery cell arrangement 32, 32' into the groove 46 in one of the frame elements 18, 18'. The free groove 46 in the adjacent battery cell arrangement 32' or 32 completes the protection of the cooling tube 26 when the battery arrangement 40 is assembled. Although it is in principle possible to form the cooling tube 26 integrally with the frame element 18, 18', it is, however, in many cases advantageous to manufacture the cooling tube 26 separately, for manufacturing reasons.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SYMBOLS

10 Battery cell
12 Cell body
12a, 12b End surface
14 Cell rim
16 Contact section
18 Frame element
20 Frame section
22 Holding section
25 Cooling channel
26 Cooling tube
28 Clamping apparatus
30 Recess
31 Vent opening
32, 32' Battery cell arrangement
34 Projection
36 Slot
38 Recess
40 Battery arrangement
42 Elastomer layer
44 Cold plate
46 Groove

What is claimed is:

1. A battery cell arrangement comprising:
    a battery cell comprising:
        a cell body having a first planar surface and a second planar surface;
        a cell rim comprising a flexible material, the cell rim surrounding a periphery of the cell body; and
        electric contact sections at a peripheral edge of the cell body; and
    a frame arrangement at least partially surrounding the periphery of the cell body, the frame arrangement comprising:
        a first frame element having a first cooling channel section;
        a second frame element having a second cooling channel section and, when the first frame element and the second frame element are in an operating position on the cell body, the first cooling channel section of the first frame element and the second cooling channel section of the second frame element together form a tubular liquid cooling channel which extends across the contact sections; and
        a vent opening at a side of the frame arrangement facing away from the first planar surface and the second planar surface, the vent opening being configured to permit flow of a fluid from the battery cell.

2. The battery cell arrangement of claim 1, wherein the vent opening is adjacent a side of the cell body which is opposite a side of the cell body from which the electric contact sections extend.

3. The battery cell arrangement of claim 1, wherein the vent opening is arranged at a bottom region of the battery cell when the battery cell is in an operating position.

4. The battery cell arrangement of claim 1, wherein the vent opening is formed by a recess on the first frame element and a recess on the second frame element.

5. The battery cell arrangement of claim 1, wherein the cooling channel extends along a plane which is offset and parallel to a plane defined by the contact sections.

6. The battery cell arrangement of claim 1, wherein the cooling channel has an inlet opening and an outlet opening at opposite sides of the frame arrangement.

7. The battery cell arrangement of claim 1, wherein the cooling channel has a straight-line profile.

8. The battery cell arrangement of claim 1, wherein the first cooling channel section and the second cooling channel section are respectively formed by a recess.

9. The battery cell arrangement of claim 1, wherein the frame arrangement further comprises a cooling tube in the cooling channel.

10. The battery cell arrangement of claim 1, further comprising a cold plate thermally conductively connected to and in direct contact with the cooling channel.

11. The battery cell arrangement of claim 10, further comprising an elastomer layer which at least partially covers one of the first planar surface and the second planar surface of the cell body.

12. The battery cell arrangement of claim 11, wherein at least one of the first frame element and the second frame element has a depression for accommodating at least one of the cold plate and the elastomer layer.

13. The battery cell arrangement of claim 1, wherein the frame arrangement further comprises a clamping apparatus configured to clamp the cell rim between the first frame element and the second frame element by a friction fit, to thereby fix the battery cell.

14. The battery cell arrangement of claim 13, wherein the clamping apparatus comprises a slot in one of the first frame element and the second frame element and a projection on the other one of the first frame element and the second frame element the slot being configured to receive the projection such that the cell rim is at least partially clamped therebetween.

15. The battery cell arrangement of claim 13, wherein the clamping apparatus extends along an entire length of the cell body at two opposite sections of the frame arrangement.

16. The battery cell arrangement of claim 1, further comprising a clamping apparatus to clamp the cell rim between the first frame element and the second frame element and thereby fix the battery cell in the frame arrangement,
    wherein the clamping apparatus comprises a slot in the first frame element which forms a tongue-and-groove connection with a projection on the second frame element into which the cell rim is clamped.

17. A stack comprising:
a plurality of battery cell arrangements, each one of the battery cell arrangements comprising:
a battery cell comprising:
a cell body having a first planar surface and a second planar surface;
a cell rim comprising a flexible material and surrounding a periphery of the cell body; and
a plurality of electric contact sections extending from a single side of the cell body; and
a frame arrangement surrounding the periphery of the cell body, the frame arrangement comprising:
a first frame element having a first cooling channel section;
a second frame element having a second cooling channel section, and, when the first frame element and the second frame element are in an operating position on the cell body, the first cooling channel section of the first frame element and the second cooling channel section of the second frame element together form a tubular liquid cooling channel which extends adjacent to the contact sections; and
a vent opening at a side of the frame arrangement facing away from the first planar surface and the second planar surface, the vent opening being configured to permit flow of a fluid from the battery cell.

18. A battery cell arrangement comprising:
a battery cell comprising:
a cell body;
a cell rim surrounding a periphery of the cell body; and
electric contact sections at one edge of the cell body;
a frame arrangement covering the periphery of the cell body, the frame arrangement comprising:
a first frame element having a first recess forming a first cooling channel section;
a second frame element having a second recess forming a second cooling channel section and, when the first frame element and the second frame element are in an operating position on the cell body, the first cooling channel section of the first frame element and the second cooling channel section of the second frame element together form a tubular liquid cooling channel which extends adjacent to the contact sections;
a vent opening formed by a first recess and a second recess at a bottom region of the battery cell when the battery cell is in an operating position, the vent opening configured to permit flow of a fluid from the battery cell; and
a clamping apparatus comprising a slot in one of the first frame element and the second frame element and a projection on the other one of the first frame element and the second frame element, the slot being configured to receive the projection therein so as to at least partially clamp the cell rim between the slot and the projection.

19. The battery cell arrangement of claim 18, further comprising:
a cooling tube in the cooling channel;
a cold plate thermally conductively connected to and in direct contact with the cooling channel; and
an elastomer layer which at least partially covers one of a first planar surface and a second planar surface of the cell body.

* * * * *